T. F. POWELL.

AERIAL TOY PARACHUTE.

Reissued Apr. 19, 1921. APPLICATION FILED JAN. 31, 1921. 15,091.

2 SHEETS—SHEET 1.

Inventor:
Thomas F. Powell
By Francis N. Hough
Attorney.

T. F. POWELL.

AERIAL TOY PARACHUTE.

Reissued Apr. 19, 1921. APPLICATION FILED JAN. 31, 1921. 15,091.

2 SHEETS—SHEET 2.

Inventor:

Thomas F. Powell

By Frank H. Hough

Attorney.

UNITED STATES PATENT OFFICE.

THOMAS F. POWELL, OF RETSIL, WASHINGTON.

AERIAL TOY PARACHUTE.

15,091. Specification of Reissued Letters Patent. Reissued Apr. 19, 1921.

Original No. 1,362,894, dated December 21, 1920, Serial No. 355,969, filed February 3, 1920. Application for reissue filed January 31, 1921. Serial No. 441,694.

*To all whom it may concern:*

Be it known that I, THOMAS F. POWELL, a citizen of the United States, residing at Retsil, in the county of Kitsap and State of Washington, have invented certain new and useful Improvements in Aerial Toy Parachutes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in aerial toys, and especially in the provision of an arrow having a socket adapted to contain a figured toy with a parachute, the figure being released at an elevation and permitted to descend with the parachute.

The invention comprises various other details of construction, combination and arrangement of parts which will be hereinafter fully described, shown in the accompanying drawings and then specifically defined in the appended claims.

My invention is illustrated in the accompanying drawings which, with the letters of reference marked thereon, form a part of this application, and in which:

Fig. 4 is a detail view showing the parachute and toy released.

Fig. 5 is a top plan view of the hollow receptacle forming part of the aerial toy.

Fig. 6 is a fragmentary detail view of the figure, forming part of the device, with the parachute cords secured to the head thereof.

Fig. 7 is a fragmentary detail view of the feet of the figure and the elastic member passing therebeneath.

Figure 1:
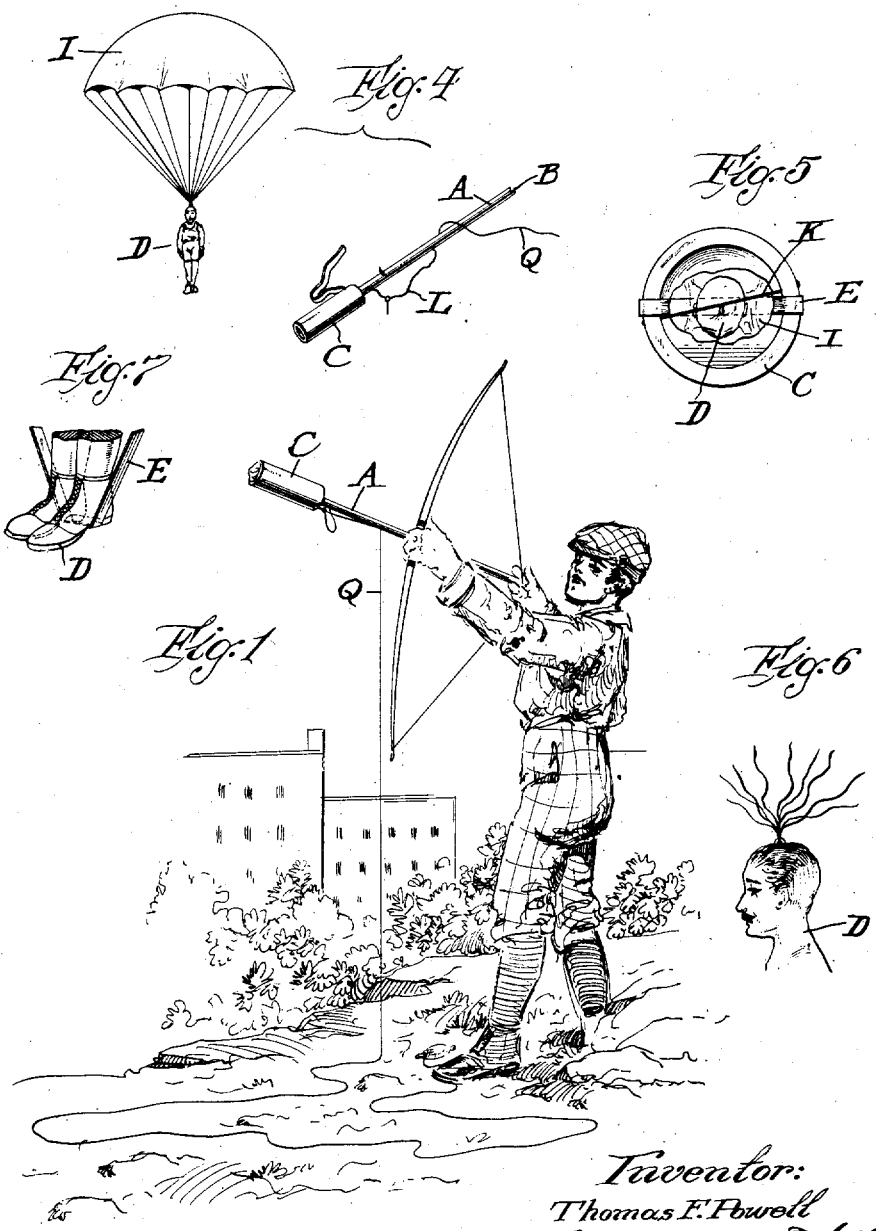
Figure 1 is a perspective view showing the application of the device.
Figure 2:
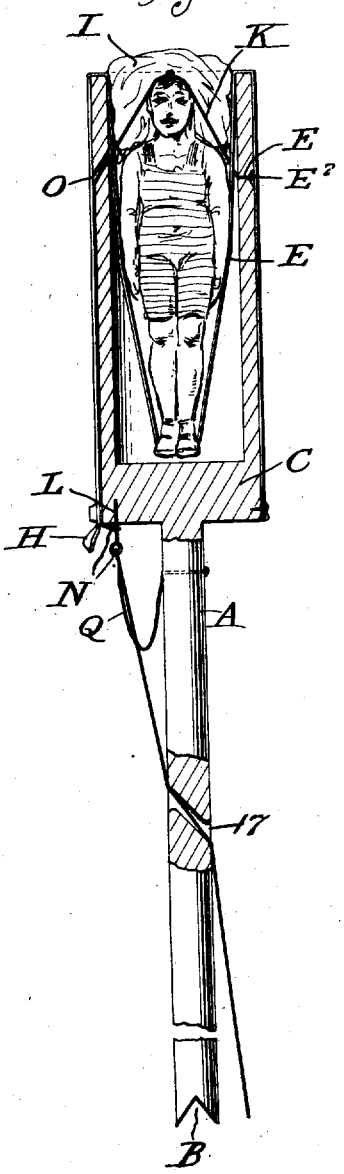
Fig. 2 is a central view through the device.
Figure 3:
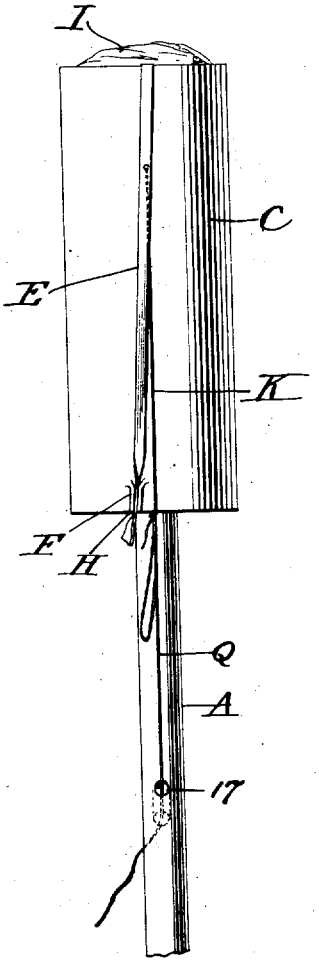
Fig. 3 is a side elevation.

Reference now being had to the details of the drawings by letter:

A designates the shaft of the arrow notched as at B, and C is a hollow receptacle of general cylindrical shape at one end of the shaft adapted to contain a figured toy D. A rubber band E is adapted to be placed underneath the feet of the toy and passed through notches F formed diagonally opposite in the edge of the receptacle, said rubber thence passed underneath the lower part of the receptacle and made to engage notches H therein. A parachute I with a string K attached thereto is fastened to the head of the figured toy, the cord passing over the figure holding the same in the manner shown in Fig. 2 of the drawings, in which the rubber band E is under tension, said cord passing through an aperture E′ in the wall of the receptacle and knotted as at $E^2$, and also passed through a slot O formed in the wall of the receptacle, thence passing down to and fastened to a pin L removably held in the bottom of the receptacle. Said pin is provided with an eye N to which a trip string Q is fastened and which passes through a hole 17 in the shaft A and is secured thereto, a sufficient slack being left intermediate the shaft and the pin to permit the latter to be easily removed from its socket in the bottom of the casing.

Said trip string is measured off to a length somewhat shorter than the range of the arrow and is adapted to be held by the foot of the person operating the device, the balance of the string lying in a coil upon the ground.

In operation, the toy is placed within the receptacle with the feet of the figure engaging over the rubber band which is put under tension and held thereby through the medium of the cord K which is fastened to the pin in the manner described.

When it is desired to operate the toy, the cord of the bow is placed in the notch B and the shaft fired into the air and when the limit of the upper movement of the upper shaft is reached, the trip string will pull the pin L from its socket releasing the cord K which has a half-hitch about the pin and the toy being released, the rubber band will cause the toy to be thrown from the receptacle and the figure will fall by gravity the parachute opening as it descends.

What I claim to be new is:

1. An aerial toy comprising an arrow shaft with a receptacle at one end, a figured toy with parachute adapted to be contained within said receptacle, a rubber band for releasing the toy from the receptacle, and means for automatically releasing said toy at a predetermined time.

2. An aerial toy comprising an arrow shaft with a receptacle at one end, a figured toy with a parachute adapted to be contained within said receptacle, and a rubber band for releasing the toy from the receptacle, a string fastened at one end to the receptacle and passing about the head of said toy adapted to hold the rubber band under tension, a releasing pin to which said string is attached, and a releasing cord attached to said pin and to the shaft of the arrow.

3. An aerial toy comprising an arrow shaft, an open ended receptacle at one end, the ends of the receptacle being notched, a rubber band engaging said notches and spanning the opening in said receptacle, a figured toy and parachute attached thereto adapted to be contained within the receptacle and holding said rubber band under tension, a cord fastened at one end of the receptacle and passing over the head of the toy, a releasing pin engaged by said cord, and a releasing cord attached to the pin and to the shaft of the arrow.

In testimony whereof I hereunto affix my signature.

THOMAS F. POWELL.